April 29, 1952 — O. AMIET — 2,594,708
AUTOMATIC CUTTING MACHINE
Filed Aug. 1, 1947 — 2 SHEETS—SHEET 1

Inventor
O. Amiet
By Robert E. Burns
Attorney

Patented Apr. 29, 1952

2,594,708

UNITED STATES PATENT OFFICE 2,594,708

AUTOMATIC CUTTING MACHINE

Oscar Amiet, La Chaux de Fonds, Switzerland, assignor to Mistress Albert Murback, Colombier, Switzerland Application August 1, 1947, Serial No. 765,581
In Switzerland June 14, 1946

Section 1, Public Law 690, August 8, 1946
Patent expires June 14, 1966

4 Claims. (Cl. 29—63)

The present invention refers to an automatic cutting machine, of the type in which a toolholder carrying at least one cutting tool is mounted revolvably around the axis of the bar to be cut, and comprising a mechanism for the automatic control of the radial displacement of the tool. This machine is characterized by the fact that the automatic bar feeding device comprises two adhesion feeding wheels, between which the bar is pressed and one of which, at least, is a driving wheel, and by the fact that the driving adhesion wheel is operatively connected with a feeding lever of said bar feeding device, on the one hand, and with a blocking element on the other hand, whilst cams are operatively connected with said feeding lever and said blocking element, in such a way as to operate them alternatively, whereby the driving wheel is blocked during the return movement of the feeding lever.

The attached drawing represents schematically and partially, by way of example, one embodiment of the invention.

Figure 1:
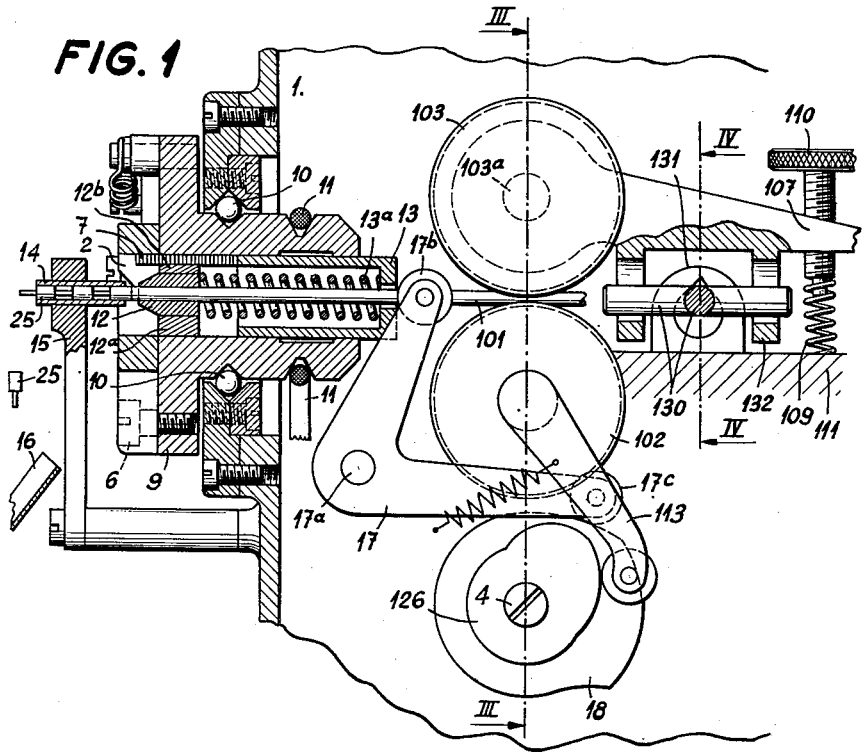
Fig. 1 is a partial view in elevation with parts in section of this embodiment.
Figure 2:
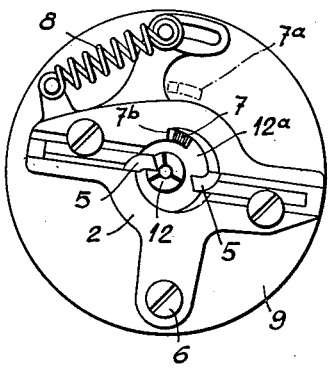
Fig. 2 is a front view of the tool-holder.
Figure 4:
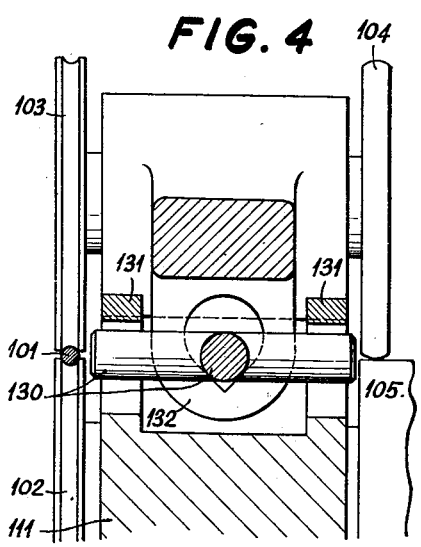
Fig. 4 is a cross-section of the feeding device along line IV—IV of Fig. 1.
Figure 3:
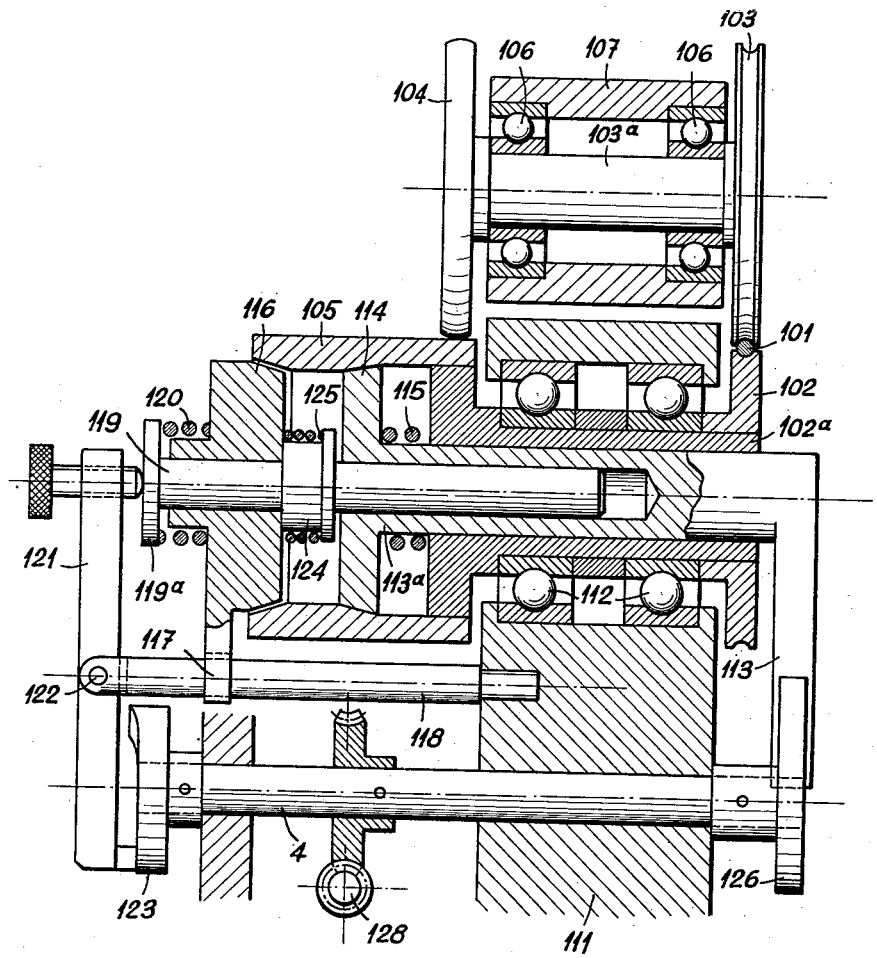
Fig. 3 is a cross-section along line III—III of Fig. 1.

The cutting machine comprises a frame 1 on which is mounted a revolving tool-holder 2 and a camshaft 4 for the automatic control of a bar feeding device and of the mechanism controlling the radial displacement of the tools. The toolholder carries two cutting tools 5 and can oscillate around a gudgeon-pivot 6, under the action of a lug 7, against which it is applied by means of a return spring 8. The gudgeon pivot 6 is screwed tight on a hub 9 mounted on a ball-bearing 10 and driven by a belt 11.

In the front center of this hub is provided a guiding die 12, and in the rear center there is an axial pusher 13 with an inner return spring 13a. This pusher extends forwards in the shape of a lug 7, passing through a longitudinal gap 12b cut in periphery of a sleeve 12a forced in the hub 9. Thus lug 7 has one side which is straight, in a longitudinal direction, and in contact with a corresponding shoulder 7b of the tool-holder 2. The opposite side of the lug 7 is oblique in respect with the longitudinal axis and can slide against the corresponding side of the gap 12b, which has the same obliquity. By this means, the axial pusher 13 controls the radial motion of the tools 5.

A tube 14, placed in the prolongation of the guiding die 12, is fixed on a support 15 secured on the frame 1. A gutter 16 collects the pieces 25 which have been cut from the bar, and directs them away from the chips, which fall below the cutting tools.

The axial pusher 13 is moved by a cranked lever 17 pivoted in 17a and carrying a roller 17b cooperating with said axial pusher and a roller 17c cooperating with a cam 18.

The machine comprises two bar-feeding wheels 102 and 103, with grooves of semi-circular cross-section, between which is pressed the bar 101 to be cut. The wheel 103 is keyed on a shaft 103a at the other end of which is keyed an adhesion wheel 104 which bears on a cylinder 105. This cylinder forms one end of a hollow shaft 102a on whose other end is keyed the wheel 102. The shaft 103a is journalled in ball-bearings 106 mounted in a lever 107. This lever is pivoted on a universal joint comprising a cross-shaft 130, one branch of which is journalled in heart-shaped eyelets 132 of lever 107 whilst the other branch is journalled in similar heart-shaped eyelets 131 of the frame 111. The lever 107 carries an adjusting screw 110 pressing through a spring 109 on the frame 111 and enabling to adjust the adhesion pressure of the wheels 103 and 104 on the wheel 102 and the cylinder 105. The pressure 103—102 is obviously equal to the pressure 104—105, since these pressures are equalized by the universal joints 130.

The wheel 102 and its cylinder 105 are journalled on ball bearings 112 mounted on the frame 111. The shaft 113a of the feeding lever 113 can rotate in the axial bore of the hollow shaft 102a and effectuate also a slight axial sliding motion. At its end opposite the lever 113, the shaft 113a carries a feeding clutch cone 114 which tends to engage itself in a corresponding inner cone in the cylinder 105 under the action of a spring 115. A second inner cone is provided in cylinder 105 to cooperate with a blocking cone 116 mounted on a shaft 119 which is apt to slide in an axial bore of the shaft 113a. This cone presents a retaining fork 117 which prevents it from rotating. This fork engages on a finger 118 which is secured on the frame 111 and only allows said blocking cone to move axially. This cone 116 is mounted slidably also on the shaft 119. This shaft presents a shoulder 119a against which bears a return spring 120 of cone 116, this cone is thus applied against the middle part 124 of the shaft 119.

The engagement of the cone 116 with the cylinder 105 is operated by means of a lever 121 pivoted in 122, under the action of a cam 123. This cam is secured on a shaft 4, journalled in the frame 111 and driven by a worm screw 128. At the opposite end of this shaft is keyed the feeding cam 126. On the drawing, the feeding cone 114 is shown in its engaged position, under the action of the spring 115.

The operation of this cutting machine is as follows: In order to manufacture the pieces 25, for instance, one of the cutting tools is set to turn the cylindrical part of small diameter, while the bar advances under the action of the wheels 102 and 103. The other cutting tool then cuts off the terminated piece by advancing radially under the action of the lug 7 of the axial pusher 13, operated by the lever 17, which is actuated itself by the cam 18.

And the same cycle starts again, the finished pieces 25 passing through the tube 14 to fall along the gutter 16, away from the heap of chips below the tools.

The advantage of this machine is that the bar does not revolve. One can cut bars of any shape: The guiding die 12 has a cross-section corresponding to that of the bar to be cut.

The operation of the feeding device is as follows:

The lever 113 still remains a certain amount of time in the same position, on account of a cylindrical part of the cam 126. At this moment, the cam 123 operates the lever 121, which pushes the axis 119 in axial direction, whereby the spring 120 presses the blocking cone 116 into the cylinder 105. The axis 119 is thrust more deeply by the lever 121, this increasing the pressure of spring 120. The middle part 124 liberates the feeding clutch cone 114 by compressing the spring 115. It is therefore only after the blocking of the cylinder 105 by the cone 116, that the cone 114 is liberated from the cylinder, and during all these movements the lever 113 has been resting on the cylindrical part of the cam 126. At this moment this cam allows the lever 113 to come back to its starting position.

Afterwards, the cam 123 allows the lever 121 to move backwards under the action of the spring 120. The movements which have just been described then develop themselves again in the opposite direction. The cone 114 is engaged into the cylinder 105, then the blocking cone 116 is liberated under the action of the spring 125, the pressure of spring 120 being neutralized by the middle 124 of the axis 119.

Alternatively, one can provide a single driving wheel presenting a groove of trapezoidal cross-section and cooperating with a spring roller.

One can obviously interchange the elements operating the feeding clutch and the blocking cone. Instead of cones, one could also use any other surface of revolution, or disk, etc.

The grooves of the adhesion wheels pressing the bar could have any other cross-section.

What I claim is:

1. A rod feed device for an automatic cutting machine, comprising, in combination, two peripherally grooved adhesion feeding wheels between which passes the bar to be cut, a yieldable biasing means for said feeding wheels whereby said bar is elastically pressed between said wheels, a swinging feeding lever, an axially slidable driving cone dependent on said lever, a first inner cone dependent on one of said feeding wheels, said one of said wheels being a driving wheel for the bar, a spring urging said driving cone into engagement with said inner cone, a first cam operating said feeding lever, a non-revolvable, axially slidable blocking cone, a second lever axially controlling both said driving cone and said blocking cone, a second cam operating said second lever, a second inner cone dependent on said driving wheel and adapted to cooperate with said blocking cone, the form of both of said cams being such that during the forward movement of the swinging lever the blocking cone is disengaged and said driving wheel is driven by said swinging lever and during the return movement of said lever, said driving wheel is blocked by the blocking cone, the blocking cone being engaged before the driving cone is liberated and being liberated after the driving cone has been engaged.

2. A rod feed device for an automatic cutting machine comprising, in combination, two peripherally grooved adhesion feeding wheels between which passes the bar to be cut, a yieldable biasing means for said feeding wheels whereby said bar is elastically pressed between said wheels, two shafts each carrying one of said feeding wheels, two second adhesion wheels arranged in contact with one another each secured on one of said shafts, a lever in which is journalled one of said shafts, a universal joint for fixing said lever, an adjusting screw for balancing the pressure on the feeding wheels and on the second adhesion wheels, a swinging feeding lever, a friction clutch through which said feeding lever is operatively connected to at least one of the feeding wheels, said wheel to which said feeding lever is connected being a driving wheel for the bar, a first cam operating said feeding lever, a friction blocking device for said driving wheel, a second cam operating said blocking device, whereby the driving wheel is driven by the swinging lever during its forward movement and is blocked during the return movement of said feeding lever.

3. A mechanical movement for driving the feeding wheels of an automatic cutting machine comprising, in combination, a swinging feeding lever, an axially slidable driving cone dependent on said lever, a first inner cone and a second inner cone connected to one of said feeding wheels, a spring urging said driving cone into engagement with said first inner cone, a first cam operating said feeding lever, a non-revolvable, axially slidable blocking cone, a second lever axially controlling said driving cone and said blocking cone, a second cam operating said second lever, said second inner cone being adapted to cooperate with said blocking cone, the form of both cams being such that during the forward movement of the swinging lever the blocking cone is disengaged and one of said wheels is driven by said swinging lever and that during the return movement of said lever, said wheel is blocked by the blocking cone, the blocking cone being engaged before the driving cone is liberated and being liberated after the driving cone has been engaged.

4. A mechanical movement for driving the feeding wheels of an automatic cutting machine comprising, in combination, two shafts each adapted to carry one of said feeding wheels, two adhesion wheels arranged in contact with one another each secured on one of said shafts, a lever in which is journalled one of said shafts, a universal joint for fixing said lever, an adjusting screw for balancing the pressure on the feeding wheels and on the adhesion wheels, a swinging feeding lever, a friction clutch through which said lever is adapted to be operatively connected to at least one of the feeding wheels, a first cam operating said lever, a friction blocking device for the wheel actuated by said lever, a second cam operating said blocking device, whereby the wheel is driven by the swinging lever during its forward movement and is blocked during the return movement of said lever.

OSCAR AMIET.

REFERENCES CITED

The following references are of record in the file of this patent:

UNITED STATES PATENTS

| Number | Name | Date |
|---|---|---|
| 504,102 | Claussen | Aug. 29, 1893 |
| 517,004 | Grant | Mar. 20, 1894 |
| 539,964 | Spencer | May 28, 1895 |
| 549,108 | Crombie | Nov. 5, 1895 |
| 642,885 | Swasey | Feb. 6, 1900 |
| 646,287 | Hundhausen | Mar. 27, 1900 |
| 1,118,411 | Granz | Nov. 24, 1914 |
| 2,262,178 | Gest | Nov. 11, 1941 |
| 2,377,383 | Slovak | June 5, 1945 |
| 2,398,355 | Bristol | Apr. 16, 1946 |
| 2,414,826 | Maltby | Jan. 28, 1947 |

FOREIGN PATENTS

| Number | Country | Date |
|---|---|---|
| 462,966 | Germany | July 19, 1928 |